(12) United States Patent
Ewald et al.

(10) Patent No.: US 12,374,084 B2
(45) Date of Patent: Jul. 29, 2025

(54) DATA AUGMENTATION FOR A MACHINE LEARNING METHOD

(71) Applicant: KONINKLIJKE PHILIPS N.V., Eindhoven (NL)

(72) Inventors: Arne Ewald, Hamburg (DE); Frank Michael Weber, Norderstedt (DE); Irina Waechter-Stehle, Hamburg (DE); Tobias Wissel, Lübeck (DE); Matthias Lenga, Mainz (DE); Jochen Peters, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 291 days.

(21) Appl. No.: 17/780,975

(22) PCT Filed: Dec. 7, 2020

(86) PCT No.: PCT/EP2020/084926
§ 371 (c)(1),
(2) Date: May 28, 2022

(87) PCT Pub. No.: WO2021/116036
PCT Pub. Date: Jun. 17, 2021

(65) Prior Publication Data
US 2022/0415021 A1 Dec. 29, 2022

(30) Foreign Application Priority Data
Dec. 12, 2019 (EP) .................................. 19215479

(51) Int. Cl.
*G06V 10/772* (2022.01)
*G06V 10/774* (2022.01)

(52) U.S. Cl.
CPC .......... *G06V 10/772* (2022.01); *G06V 10/774* (2022.01); *G06V 2201/03* (2022.01)

(58) Field of Classification Search
CPC ............... G06V 10/772; G06V 10/774; G06V 2201/03; G06F 18/214
See application file for complete search history.

(56) References Cited

U.S. PATENT DOCUMENTS

| | | |
|---|---|---|
| 2003/0228040 A1 | 12/2003 | Oosawa |
| 2015/0055842 A1* | 2/2015 | Codella ..................... G06T 7/12 382/128 |

(Continued)

FOREIGN PATENT DOCUMENTS

WO    WO2020126993 A1    6/2020

OTHER PUBLICATIONS

PCT International Search Report, International application No. PCT/EP2020/084926, Jan. 12, 2021.

(Continued)

*Primary Examiner* — Santiago Garcia

(57) ABSTRACT

A mechanism for creating/synthesizing realistic training data, for training a machine-learning model, using anatomical knowledge. An anatomical model can be obtained. Information from annotated training data entries (i.e. "ground truth" information), can be used to model the anatomical variation, from the obtained model, in the population of the training data. This anatomical model can then be modified, e.g. incorporating some random factors, in order to generate one or more augmented models of realistic anatomies. The augmented anatomy is then transferred from the model domain to the data entry domain to thereby generate a new data entry or data entries for training a machine-learning model. This latter process can be achieved in various ways, e.g. using GANs, such as CycleGANs and label images, or deformation vector fields.

12 Claims, 1 Drawing Sheet

(56) References Cited

U.S. PATENT DOCUMENTS

| | | | | |
|---|---|---|---|---|
| 2015/0238148 | A1* | 8/2015 | Georgescu | G06F 18/28 600/408 |
| 2016/0275678 | A1* | 9/2016 | Onal | G06V 10/50 |
| 2017/0257844 | A1 | 9/2017 | Miller et al. | |
| 2019/0197358 | A1* | 6/2019 | Madani | G06N 3/045 |
| 2020/0237452 | A1* | 7/2020 | Wolf | G06F 3/048 |
| 2020/0327661 | A1* | 10/2020 | Oved | G16H 30/20 |
| 2021/0097880 | A1* | 4/2021 | Kuester | G06F 3/04815 |
| 2021/0110605 | A1* | 4/2021 | Haslam | G06T 7/11 |
| 2021/0150714 | A1* | 5/2021 | Buerger | G16H 30/40 |
| 2021/0158526 | A1* | 5/2021 | Patil | G06N 3/08 |
| 2022/0130084 | A1* | 4/2022 | Litwiller | G06T 5/60 |
| 2022/0215551 | A1* | 7/2022 | Vilsmeier | G06T 7/30 |
| 2022/0237785 | A1* | 7/2022 | Mitchell | G06V 10/82 |

OTHER PUBLICATIONS

Sedai S. et al., "Segmentation of Right Ventricle in Cardiac MR Images Using Shape Regression", Oct. 2, 2015, Robocup 2008: Robocup 2008: Robot Soccer World Cup XII ; [Lecture Notes in Computer Science; Lect.Notes Computer], Springer International Publishing, Cham, pp. 1-8, XP047496717.

Tang Z. et al., "An Augmentation Strategy for Medical Image Processing Based on Statistical Shape Model and 3D Thin Plate Spline for Deep Learning", IEEE Access, vol. 7, Sep. 12, 2019, pp. 133111-133121, XP011747463.

Zhao A. et al., "Data augmentation using learned transforms for one-shot medical image segmentation", Proceedings of the IEEE/CVF Conference on Computer Vision and Pattern Recognition (CVPR), 2019, pp. 8543-8553, Feb. 25, 2019.

Zhong X. et al., "Action Learning for 3D Point Cloud Based Organ Segmentation", Computer Vision and Pattern Recognition (cs.CV), arXiv:1806.05724v1, Jun. 14, 2018.

Saito A. et al., "A Statistical Shape Model for Multiple Organs Based on Synthesized-Based Learning", International MICCAI Workshop on Computational and Clinical Challenges in Abdominal Imaging ABD-MICCAI 2013: Abdominal Imaging. Computation and Clinical Applications pp. 280-289, 2013.

Frid-Adar M. et al., "Synthetic Data Augmentation Using GAN for Improved Liver Lesion Classification", 2018 IEEE 15th International Symposium on Biomedical Imaging (ISBI 2018), 2018, pp. 289-293, 2018.

Russakovsky O. et al.,"ImageNet Large Scale Visual Recognition Challenge," International Journal of Computer Vision, vol. 115, No. 3, pp. 211-252, Dec. 2015.

Frid-Adar M. et al., "GAN-Based Synthetic Medical Image Augmentation for Increased CNN Performance in Liver Lesion Classification," Neurocomputing, vol. 321, pp. 321-331, Dec. 2018.

Zhu J.-Y. et al., "Unpaired Image-to-Image Translation using Cycle-Consistent Adversarial Networks," ICCV 2017, Computer Vision and Pattern Recognition, ArXiv170310593 Cs, Mar. 2017.

Ecabert O. et al., Automatic Model-Based Segmentation of the Heart in CT Images, IEEE Transactions on Medical Imaging, vol. 27, No. 9, pp. 1189-1201, Sep. 2008.

Ronneberger O. et al., "U-Net: Convolutional Networks for Biomedical Image Segmentation," Medical Image Computing and Computer-Assisted Intervention—MICCAI 2015, 2015, Lecture Notes in Computer Science, vol. 9351, pp. 234-241, 2015.

Brosch T. et al., "Foveal Fully Convolutional Nets for Multi-Organ Segmentation", SPIE Proceedings vol. 10574, Medical Imaging 2018: Image Processing; 105740U (2018).

Kenho I. et al., "Deep Learning Data Support Tool for 3D Medical Imaging Growth RVT", Imaging Information Medical, vol. 51, No. 8, p. 35-40, Jul. 2019.

* cited by examiner

DATA AUGMENTATION FOR A MACHINE LEARNING METHOD

CROSS-REFERENCE TO PRIOR APPLICATIONS

This application is the U.S. National Phase application under 35 U.S.C. § 371 of International Application No. PCT/EP2020/084926, filed on Dec. 7, 2020, which claims the benefit of European Patent Application No. 19215479.7, filed on Dec. 12, 2019. These applications are hereby incorporated by reference herein.

FIELD OF THE INVENTION

The present invention relates to the field of generating augmented data for aiding in the training of a machine-learning method.

BACKGROUND OF THE INVENTION

There is a growing trend of using machine-learning methods to analyze medical data in order to predict or identify features of the medical data. Such methods aids a clinician in assessing the patient, e.g. to improve a diagnosis or treatment of the patient. Exemplary machine-learning methods may perform tasks such as image segmentation or landmark detection.

However, machine-learning methods require a large amount of consistently annotated training data. Indeed, the robustness/performance of these machine-learning methods is largely dependent upon the availability of a sufficiently large and accurate training data set. However, obtaining such data sets is difficult and/or costly, especially in the medical domain. This is primarily because medical experts, who would have limited time availability, have to be paid to annotate training data. For several applications, it may also be necessary to use multiple experts to generate consensus, to ensure that the training data is sufficiently accurate.

There is also an ongoing problem with specificity of the training data, as the statistics of the data used to train the machine-learning method should match the statistics of the population that is subsequently analyzed by the machine-learning method. This increases the difficulty in obtaining suitable data sets for training a machine-learning method for a particular application.

Data augmentation is of growing interest, in order to automatically generate new entries for a training data. Typical methods of data augmentation comprise modifying existing training data entries to synthesize new training entries. When a training data entry comprises an image, data augmentation may comprise rotating, skewing and/or flipping (parts of) the image, or introducing artefacts into the image (e.g. adding noise or color aberrations).

There is an ongoing desire to improve data augmentation for machine-learning methods, particularly in the medical domain. This will result in more accurate machine-learning methods able to generate information for assisting a clinician in performing a task or diagnosing or treating the patient.

SUMMARY OF THE INVENTION

The invention is defined by the claims.

According to examples in accordance with an aspect of the invention, there is provided a computer-implemented method of generating annotated augmented data elements for training a machine-learning algorithm that processes a data element of an anatomical structure to annotate generate one or more annotations.

The computer-implemented method comprises: obtaining one or more annotated data elements, each providing information about a same type of anatomical structure; obtaining an anatomical model of the type of anatomical structure; deforming the anatomical model, using one or more deformation techniques; and generating, based on the deformed anatomical model, one or more annotated augmented data elements, each providing predicted information of the anatomical structure, wherein the step of obtaining the anatomical model and/or the step of deforming the anatomical model is based on at least the one or more annotated data elements.

The present invention enables the generation of additional/synthetic/augmented annotated data elements, of an anatomical structure, for training a machine-learning algorithm.

The machine-learning algorithm is any algorithm that processes a suitable data element, such as an image or raw ultrasound data, to generate an annotation, e.g. classify the anatomical structure associated with the data element, predict a property of the anatomical structure, segment the data element, identify characteristics of the data element and so on.

An annotated data element is an example data element that has been appropriately annotated (e.g. labelled or otherwise associated with data) with information corresponding to an output of the machine-learning algorithm. For example, if the machine-learning algorithm classifies a data element, an annotated data element would comprise an example data element and its classification (as the annotation).

The present invention proposes to generate and/or modify an anatomical model of a type of anatomical structure (e.g. a heart, a liver, lungs and so on) based on one or more annotated data elements. In particular, the anatomical model is deformed or modified using a deformation technique. The deformed anatomical model is then used to generate the annotated augmented data elements, the annotated augmented data elements being further, artificial examples of the one or more annotated data elements.

Each annotated data element provides information on a same type of annotated structure (e.g. a liver, spleen, heart and so on), but may provide information on a different instance of that type of annotated structure. For example, a first annotated data sample may provide information on a heart of a first person/subject and a second annotated data sample may provide information on a heart of a second person/subject.

It will be clear to the skilled person that the anatomical model is a digital or virtual anatomical model of the type of anatomical structure.

In some embodiments, each annotated data element comprises a set of one or more annotated medical images; and each annotated augmented data element comprises a set of one or more annotated augmented medical images.

Optionally, the anatomical model is a three-dimensional anatomical model of the type of anatomical structure.

The step of obtaining the anatomical model may comprise generating the anatomical model using the one or more annotated data elements.

In some embodiments, the obtained anatomical model comprises first data representing a generic shape of the anatomical structure on which information is provided by the one or more annotated data elements; and second data representing variations from the generic shape of the anatomical structure; and the step of deforming the anatomical model comprises: perturbing a portion of the second data and generating a deformed anatomical model by applying at least the perturbed portion of the second data to the first data.

The generic shape may, for example, be a mean shape of the anatomical structure derived from the one or more annotated data elements. That is, the one or more annotated data elements may be processed to derive a mean shape of the anatomical structure (represented by the annotated data elements), which The first data may, for example, comprise a matrix of vertices (i.e. a mesh) that together form or act as an average or mean shape of the anatomical structures on which the annotated data sample(s) provide information, i.e. the "generic shape" of the anatomical structure. The second data may, for example, provide information on how each specific anatomical structure (on which each specific annotated data sample provides information) differs or varies from the generic shape.

In at least one embodiment, the first data represents: a mean/average shape of the anatomical structures on which the one or more annotated data elements provides information; a largest shape of the anatomical structures on which the one or more annotated data elements provide information; or a smallest shape of the anatomical structures on which the one or more annotated data elements provide information.

The first data may comprises a matrix of vertices and/or polygon information (such as triangle information) that define the generic shape of the type of anatomical structure.

In some embodiments, the anatomical model is deformable according to a plurality of deformation techniques, and the step of deforming the anatomical model comprises deforming the anatomical model using a subset of the plurality of deformation techniques.

The step of generating the one or more annotated augmented data elements may comprises: generating one or more augmented data elements using the deformed anatomical model; and annotating each augmented data element with information derived from the deformed anatomical model, to thereby generate the annotated augmented data elements.

The step of generating one or more annotated augmented data elements may comprise processing the deformed anatomical model using a generative adversarial network to generate the one or more annotated augmented data elements.

As an alternative example, the step of generating one or more annotated augmented data elements may comprise computing a vector deformation field using the deformed anatomical model, and applying the vector deformation field to at least one of the annotated data elements to generate the annotated augmented data element.

The step of generating one or more annotated augmented data elements may comprise: processing the deformed anatomical structure to computer a vector deformation field; and processing one or more of the annotated data elements using the vector deformation field to generate the one or more annotated augmented data elements.

The method may further comprise a step of receiving a user input and: controlling the number of one or more annotated data elements generated responsive to the user input; and/or controlling the number or type of deformation techniques used when deforming the anatomical model to generate the deformed anatomical model responsive to the user input.

There is also proposed a computer-implemented method of training a machine-learning algorithm using annotated data elements, the method comprising: obtaining one or more annotated data elements; generating annotated augmented data elements by performing any previously described method one or more times; and training the machine-learning algorithm using the one or more annotated data elements and the annotated augmented data elements.

Any suitable machine-learning algorithm for obtaining helpful, clinical data may be used. For example, the machine-learning algorithm may be for labelling or segmenting a medical image, for identifying the occurrence of cysts or nodules, for predicting the presence of a certain condition, disease or diagnosis and so on. Generally, the machine-learning algorithm may be any algorithm that processes a data element to generate a clinically relevant and/or useful annotation.

According to examples in accordance with an aspect of the invention, there is provided a computer program product comprising computer program code means which, when executed on a computing device having a processing system, causes the processing system to perform all of the steps of the method according to any of the preceding claims. The computer program may be stored on a non-transitory computer readable medium.

According to examples in accordance with an aspect of the invention, there is provided a processing system for generating annotated augmented data elements for training a machine-learning algorithm that processes a data element of an anatomical structure to annotate generate one or more annotations.

The processing system is adapted to: obtain one or more annotated data elements, each providing information about a same type of anatomical structure; obtain an anatomical model of the type of anatomical structure; deform the anatomical model, using one or more deformation techniques; and generate, based on the deformed anatomical model, one or more annotated augmented data elements, each providing predicted information of the anatomical structure, wherein the step of obtaining the anatomical model and/or the step of deforming the anatomical model is based on at least the one or more annotated data elements.

The processing system and/or computer program may be appropriately adapted to carry out any herein described method.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
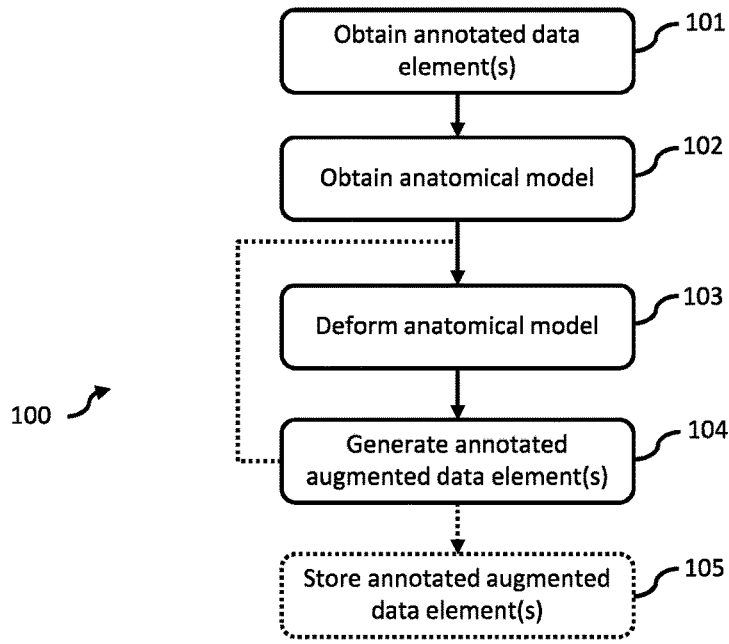
FIG. 1 is a flowchart illustrating a method according to an embodiment.

The invention will be described with reference to the FIGS.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figs. are merely schematic and are not drawn to scale. It should also be understood that the same reference numerals are used throughout the Figs. to indicate the same or similar parts.

The invention provides a mechanism for creating/synthesizing realistic training data, for training a machine-learning model, using anatomical knowledge. An anatomical model can be obtained. Information from annotated training data entries (i.e. "ground truth" information), can be used to model the anatomical variation, from the obtained model, in the population of the training data. This anatomical model can then be modified, e.g. incorporating some random factors, in order to generate one or more augmented models of realistic anatomies. The augmented anatomy is then transferred from the model domain to the data entry domain to thereby generate a new data entry or data entries for training a machine-learning model. This latter process can be achieved in various ways, e.g. using GANs, such as CycleGANs and label images, or deformation vector fields.

Embodiments are based on the realization that realistic data entries for training a machine-learning model used in the field of medicine can be created or synthesized by modifying an anatomical model.

Reference is herein made to "annotated data elements". An annotated data element is any data element (e.g. an image or set of images) that also comprises annotations or additional information. An annotation (or additional information) is a target or desired output of a machine-learning method for which the annotated data elements are intended to be used as training data.

By way of example, if there is a desire to provide a machine-learning method that automatically segments an ultrasound image, each annotated data element will comprise an example ultrasound image and segmentation information (as "annotations") of the example ultrasound image.

By way of another example, if there is a desire to provide a machine-learning method that automatically detects the presence or absence of pleural effusion from an X-ray image of a patient's lung(s), each annotated data element will comprise an example X-ray image (of a patients lung(s)) and an indicator of the presence or absence of pleural effusion (as "annotations").

The precise format and content of the annotated data elements is not essential to appreciating the underlying concept of the present invention, or to realizing the benefits of the present invention. Indeed, the skilled person would readily appreciate and understand different examples for data elements (e.g. different types of images, physiological data measurements, physical data measurements and so on), as well as suitable annotations (e.g. segmentation information, labelling information, identified conditions, identification of features (such as cysts or nodules) and so on).

FIG. 1 illustrates a method 100 according to an embodiment of the invention.

The method 100 comprises a step 101 of obtaining one or more annotated data elements, each providing information about a same type of anatomical structure (e.g. the heart, lungs, thorax, liver, kidney, brain and so on). In other words, the step 101 comprises obtaining a training data.

The one or more annotated data elements may be obtained from a database, storage or other memory module. In other examples, the one or more annotated data elements are obtained directly from one or more measurement tools, such as an ultrasound machine, MM machine, patient monitor or the like.

The one or more annotated data elements may comprise, for example, annotated medical images, although other medical data is contemplated (e.g. physiological measurements, physical measurements or the like). A medical image comprises any 2D or 3D medical image, such as a CT, MR or 3D ultrasound image.

The annotated data elements may provide information about different instances or examples of a same type of anatomical structure, e.g. the hearts of different subjects, a same heart at different points in time (e.g. expanded or contracted heart), a same heart at different angles or any combination of the foregoing.

In some examples, each annotated data element comprises a set of one or more medical images providing information on a same instance of an anatomical structure.

The method 100 further comprises a step 102 of obtaining a (anatomical) model of the anatomical structure.

In some embodiments, step 102 may comprise obtaining a generic model of the anatomical structure from a database, memory or other storage module. Thus, an existing or predetermined model may be used, e.g. a model representing a global population.

In other embodiments, the model of the anatomical structure is constructed from the one or more annotated data elements. By way of example, the annotated data elements may be processed to determine an average or mean shape of the (different instances of the) anatomical structure represented by the annotated data elements. In other examples, the annotated data elements may be processed to determine a maximum or minimum shape of the (different instances of the) anatomical structure represented by the annotated data elements.

A suitable method of constructing an anatomical model from a medical image(s) can be found in O. Ecabert et al., "Automatic Model-Based Segmentation of the Heart in CT Images," IEEE Trans. Med. Imaging, vol. 27, no. 9, pp. 1189-1101, September 2008, and is suitable for use in the present invention. However, the skilled person would appreciate that other methods of generating a model of an anatomical structure from medical data could be used.

In any embodiment, the model of the anatomical structure may comprise, for example, first data representing a generic shape of the anatomical structure on which information is provided by the one or more annotated data elements and (optionally) second data representing variations from the first data. The generic shape may be derived from the one or more annotated data elements or may be a predetermined model.

A suitable example of a first data may be a matrix $\bar{x}$ comprising vertices (and/or polygonal information) of the mean shape of the anatomical structure(s) for which the training data provides information. In other examples, the matrix $\bar{x}$ is replaced by a matrix providing the largest/maximum or smallest/minimum shape of the anatomical structures on which the one or more annotated data elements provide information.

The matrix $\bar{x}$ may, in some embodiments, contain information that defines a mesh representing the shape of the structure.

This may be calculated by generating, for each instance of the anatomical structure (e.g. each annotated data element) a model of the instance of the anatomical structure, e.g. a matrix providing information of vertices of a mesh representing the shape of the instance of the anatomical structure. For a j-th instance of an anatomical structure, this may be matrix $x_j$. The generated matrices may then be averaged (or the maximum/minimum values of the generated matrices taken) to generate the generic model of the (type of) anatomical structure on which information is provided by the one or more annotated data elements.

Preferably, the mean/largest/smallest shape is the mean/largest/smallest shape of any instance (or combination of instances) of the anatomical structure on which the annotated data elements provide information.

The matrix $\bar{x}$ may meet the following criteria: $\bar{x} \in \mathbb{R}^{V \times 3}$.

The anatomical model may further comprise information on the annotations provided by the annotated data elements. For example, the annotations may provide identifying information of different features of the anatomical model, which could be preserved in the anatomical model. This information can later be used when generating the annotated augmented data elements.

The method further comprises a step 103 of deforming the anatomical model, using one or more deformation techniques.

At least one of steps 102 and 103 is performed using the one or more annotated data elements. Thus, the anatomical model is generated and/or deformed using the one or more annotated data elements.

Step 103 could be performed in a number of ways, a first scenario of which will be hereafter described.

In this first scenario, the anatomical model comprises the first data previously described, and second data representing variations from the generic shape of the anatomical structure.

In some examples, the second data represents global/population variations, e.g. variations from a generic (e.g. mean/largest/smallest) shape according to known or global variations.

However, in preferred embodiments, the second data is generated using the one or more annotated data elements, to represent the variations from the generic shape of different ones of the one or more annotated data elements, the second data being derived from the one or more annotated data elements. The second data may, for example, indicate how the shape of each instance of an anatomical structure, for which the annotated data elements provide information, varies from the generic shape.

A combination of the one or more annotations and global/population variation could be used to define the second data. For example, the second data may comprise variations from a generic shape, derived from the one or more annotated data elements, wherein the variations are modified based on global variations.

In some examples, where the second data is derived from the one or more annotated data elements, the second data may, for each instance of the anatomical structure described in the annotated data elements, describe the necessary shape deformation to transform the generic shape (represented by matrix $\bar{x}$) into the shape of the instance of the anatomical structure.

For example, following the concept of Principle Component Analysis, a shape of a j-th instance of an anatomical structure (representing one of the annotated data elements) may be represented by a matrix $x_j$, with the necessary shape deformation being represented by the term $Pb_j$ in the following relationship:

$$x_j \approx \bar{x} + Pb_j \quad (1)$$

P contains the first M (of up to N) eigenvectors of the matrix's $\bar{x}$ (representing the generic shape) covariance matrix C given by:

$$C = \frac{1}{N-1} \sum_{i=1}^{N} (x_i - \bar{x})(x_i - \bar{x})^T \quad (2)$$

where N represents the number of different instances of the anatomical structure on which the annotated data elements provide information.

$b_j$ describes the shape deformation for a particular principle axis, so that for the j-th instance of an anatomical structure:

$$b_j = P^T(x_j - \bar{x}) \quad (3)$$

The variable b may represent the second data, so that $b_j$ represents an element of the second data. In particular, $b_j$ can represent either a parameter used to deform the (mean shape) matrix $\bar{x}$ to result in a matrix $x_j$, which represents an instance of the anatomical model illustrated in the one or more annotated data elements.

In other examples, the term $b_j$ instead represents a global or preset variation from a generic shape, e.g. reflecting known variations of an anatomical model according to a global population. Thus, b may be derived from global information.

The step of determining variations from the generic shape may be performed in either step 102 or step 103, and may be performed using the annotated data elements of global information (e.g. from literature) according to different embodiments.

Step 103 may comprise perturbing or modifying a portion of the second data and generating a deformed anatomical model by applying at least the perturbed portion of the second data to the first data.

This may be performed, for example, by slightly modifying the shape deformation $b_j$ to a synthetic shape deformation $\tilde{b}_j$, i.e. deforming the second data. One or more deformation techniques may be used to modify the shape deformation $b_j$. An augmented or deformed anatomical model (represented by a matrix $\tilde{x}$) can then be generated using the following equation:

$$\tilde{x} = \bar{x} + P\tilde{b}_j \quad (4)$$

The deforming of the shape deformation $b_j$ may be performed using preset deformations, e.g. according to known global variations in the shape or structure of an anatomical model, which may be derived from global or population data. In other examples, the deforming of the shape deformation $b_j$ may be performed by interpolating between two instances of $b_j$, e.g. interpolate between $b_j$ and $b_{j+1}$, between $b_j$ and $b_{j+2}$ and so on.

More than one synthetic shape deformation $\tilde{b}_j$ may be applied to the matrix $\tilde{x}$, e.g. representing different j-th instances of the second data, to generate plausible variations to the shape of the anatomical model.

In this way, a deformed anatomical model can be produced, where the deformed anatomical model represents an artificial or synthetized instance of an anatomical structure (i.e. not directly derived from real-life measurements).

The method 100 further comprises a step 104 of generating, based on the deformed anatomical model, one or more annotated augmented data elements, each providing predicted information of the anatomical structure.

A number of approaches for converting the deformed anatomical model into an annotated augmented data element are considered. The following examples are given in the context of each data element comprise a medical image of an instance of an anatomical structure, i.e. transforming from a model domain to an image domain. However, the skilled person would appreciate how the proposed approaches could be adapted for any form of data element.

In a first example, a Cycle-GAN (or other suitable generative adversarial network, GAN) could be used to generate the annotated augmented data element. The Cycle-GAN may, for example, be trained to transfer the style between a label or grey plateau image (which could be generated from the deformed/augmented anatomical model) and a regular medical image, such as an ultrasound image.

Figure 2:
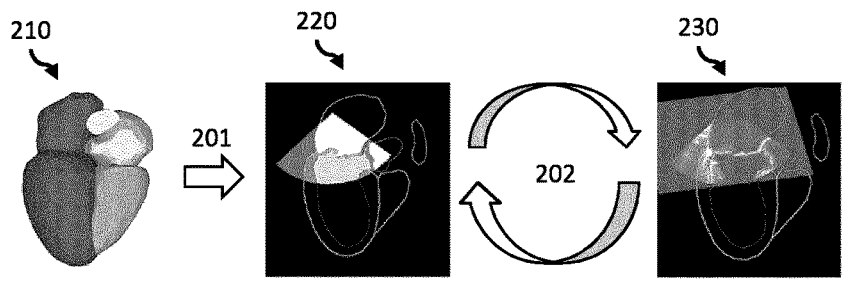
FIG. 2 schematically illustrates a method of generating an augmented data element from a deformed anatomical model.

This process is schematically illustrated in FIG. 2, which illustrates a deformed anatomical model 210. In this scenario, the annotated data elements comprise segmented and labelled ultrasound images.

In a step 201, the deformed anatomical model is used to generate a label image 220. The label image comprises labels or annotations derived from the deformed anatomical model (i.e. the anatomical model identifies elements of the synthesized instance of the anatomical structure).

The label image 220 is then processed using a Cycle-GAN in a step 202 to generate an augmented image 230 (which forms an augmented data element). The Cycle-GAN effectively transfers the style of a regular medical image, such as an ultrasound image, to the label image 220. The augmented image can be annotated with the labels of the label image, to thereby generate an annotated augmented data element.

A more complete description of the process of using a Cycle-GAN to transferring a style from one image to another (used here to transfer the style of an ultrasound image to a generated label image) may be found in J.-Y. Zhu, T. Park, P. Isola, and A. A. Efros, "Unpaired Image-to-Image Translation using Cycle-Consistent Adversarial Networks," ArXiv170310593 Cs, March 2017.

One advantage of a Cycle-GAN is that their training does not require matched image pairs, hence, a large amount of training data (for the Cycle-GAN) is much easier to obtain as compared to generate annotated data elements (for training the machine-learning method).

In a second example, realistic images could be generated using the augmented anatomical model (represented by the matrix $\tilde{x}$) and a vector deformation field technique. In particular, a vector deformation field F can be computed using the following equation:

$$F=\gamma(\tilde{x}-x_j) \qquad (5)$$

with $\gamma$ being a dilation coefficient and $x_j$ being a matrix representing a model of a j-th instance of the anatomical structure. The vector deformation field F can then be applied to the data element corresponding to the j-th instance of the anatomical structure. This can be done using an interpolation scheme such a linear or B-spline interpolation.

The augmented data element may share the annotations of the corresponding annotated data element (from which annotated data element is generated).

In particular, the deforming of the anatomical model is made with reference to a particular instance of an anatomical structure (for which a particular annotated data element provides information). The deformed model may therefore be associated with the annotation(s) of this particular annotated data element, which annotations can be transferred to the annotated augmented data element generated from the deformed model.

Referring back to FIG. 1, steps 103 and 104 may be repeated one or more times to generate a respective one or more annotated augment data elements. In this way, multiple augmented data elements, for training a machine-learning method, can be generated.

This process may be performed by repeating step 103 a number of times, e.g. by applying different deformations to a same instance of a shape deformation $b_j$ and/or different/same deformations to different instances of a shape deformation $b_j$, to thereby generate a plurality of differently deformed anatomical models, before performing step 104 on each deformed anatomical model.

In an alternative embodiment, step 103 and 104 may be iteratively performed in sequence, applying different deformations to a same instance of a shape deformation $b_j$ and/or different/same deformations to different instances of a shape deformation $b_j$, in each iteration.

In this way, a plurality of annotated augmented data elements can be generated using the anatomical model and known variations (of real-life examples) of the anatomical model, by modifying the known variations to synthesize new, but plausible, variations of the anatomical model.

As previously noted, the invention is intended for use as a prior step before training a machine-learning method, such as a (convolutional) neural network, in order to generate a large training data. In particular, by using the invention, an additional set of pseudo ground truth data (i.e. annotated augmented/synthetic data elements) is generated. Using the original data set plus the augmented data for a later network training will make the final machine-learning model (trained using such data) more robust or, (if, for instance, there are only a limited number few initially available data sets) even feasible.

The machine-learning method may, for example, perform image segmentation or landmark detection for 3D medical images such as 3D cardiac ultrasound. The skilled person would be able to understand suitable annotations and formats for such training data elements for training the machine-learning method.

In some embodiments, a user or individual may have options for controlling the amount of additional data to be created, e.g. the number of times that steps 103 and 104 of method 100 are repeated.

This can be achieved by receiving a user input and controlling the number of one or more annotated data elements generated responsive to the user input. This may, for instance, control may control how many variances are applied, e.g. repetitions of equation (3) or similar approaches, to the annotated data elements.

In some examples, the user input may alternatively or additionally control the number or type of deformation techniques used when deforming the anatomical model to generate the deformed anatomical model. Thus, there may be an additional parameter that can be used to control the number of deformation techniques that are used to modify the anatomical model.

The annotated augmented data elements may be stored in a memory or database for later in use in training a machine-learning method. This may be performed in a step 105, which is optional.

There is also proposed a corresponding method of training a machine-learning algorithm using annotated data elements. The method comprises obtaining one or more annotated data elements; generating annotated augmented data elements by performing the previously described method one or more times; and training the machine-learning algorithm using the one or more annotated data elements and the annotated augmented data elements.

The skilled person would appreciate that a machine-learning algorithm is any self-training algorithm that processes input data in order to produce or predict output data. Here, the input data comprises the data elements (including the augmented data elements) and the output data comprises the information corresponding to the annotations (e.g. labels for a medical image, a predicted medical diagnosis, a measurement of a physical feature or the like).

Suitable machine-learning algorithms for being employed in the present invention will be apparent to the skilled person. Examples of suitable machine-learning algorithms include decision tree algorithms and artificial neural networks. Other machine-learning algorithms such as logistic regression, support vector machines or Naïve Bayesian model are suitable alternatives.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

Methods of training a machine-learning algorithm are well known. Typically, such methods comprise obtaining training data, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can repeated until the error converges, and the predicted output data entries are sufficiently similar (e.g. ±1%) to the training output data entries. This is commonly known as a supervised learning technique.

For example, where the machine-learning algorithm is formed from a neural network, (weightings of) the mathematical operation of each neuron may be modified until the error converges. Known methods of modifying a neural network include gradient descent, backpropagation algorithms and so on.

The training input data entries correspond to the data elements and the augmented data elements. The training output data entries correspond to the corresponding annotations for these data elements.

The skilled person would be readily capable of developing a processing system for carrying out any herein described method. Thus, each step of the flow chart may represent a different action performed by a processing system, and may be performed by a respective module of the processing system.

Embodiments may therefore make use of a processing system. The processing system can be implemented in numerous ways, with software and/or hardware, to perform the various functions required. A processor is one example of a processing system that employs one or more microprocessors that may be programmed using software (e.g., microcode) to perform the required functions. A processing system may however be implemented with or without employing a processor, and also may be implemented as a combination of dedicated hardware to perform some functions and a processor (e.g., one or more programmed microprocessors and associated circuitry) to perform other functions.

Examples of processing system components that may be employed in various embodiments of the present disclosure include, but are not limited to, conventional microprocessors, application specific integrated circuits (ASICs), and field-programmable gate arrays (FPGAs).

In various implementations, a processor or processing system may be associated with one or more storage media such as volatile and non-volatile computer memory such as RAM, PROM, EPROM, and EEPROM. The storage media may be encoded with one or more programs that, when executed on one or more processors and/or processing systems, perform the required functions. Various storage media may be fixed within a processor or processing system or may be transportable, such that the one or more programs stored thereon can be loaded into a processor or processing system.

Figure 3:
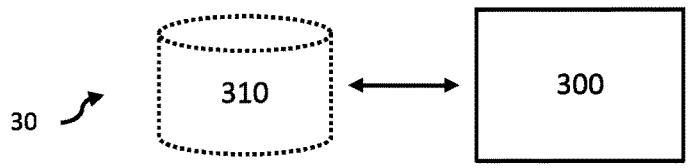
FIG. 3 illustrates a system according to an embodiment.

A suitable example of a processing system 300 is illustrated in FIG. 3. The processing system is formed as an aspect of an augmented data generation system 30, which itself is an embodiment of the invention.

The processing system 300 is adapted to obtain one or more annotated data elements, each providing information about a same type of anatomical structure. The annotated data elements may be obtained from a database, of the augmented data generation system 30, or another memory module.

The processing system 300 is also adapted to obtain an anatomical model of the type of anatomical structure. This may be performed using any previously described method.

The processing system 300 is adapted to deform the anatomical model, using one or more deformation techniques. This may be performed using any previously described method.

The obtaining and/or deforming of the anatomical model is performed using the one or more annotated data elements.

The processing system 300 is also adapted to generate, based on the deformed anatomical model, one or more annotated augmented data elements, each providing predicted information of the anatomical structure.

The processing system 300 may be configured to perform any step of any previously described method, e.g. training a machine-learning algorithm.

It will be understood that disclosed methods are preferably computer-implemented methods. As such, there is also proposed the concept of computer program comprising code means for implementing any described method when said program is run on a processing system, such as a computer. Thus, different portions, lines or blocks of code of a computer program according to an embodiment may be executed by a processing system or computer to perform any herein described method. In some alternative implementations, the functions noted in the block diagram(s) or flow chart(s) may occur out of the order noted in the Figs. For example, two blocks shown in succession may, in fact, be executed substantially concurrently, or the blocks may sometimes be executed in the reverse order, depending upon the functionality involved.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of generating annotated augmented data elements for training a machine-learning algorithm that processes a data element of an anatomical structure to generate one or more annotations, the computer-implemented method comprising:
  obtaining one or more annotated data elements, each providing information about a same type of anatomical structure, wherein each annotated data element comprises a set of one or more annotated medical images;
  obtaining an anatomical model of the type of anatomical structure, wherein the anatomical model is a three-dimensional anatomical model of the type of anatomical structure;
  deforming the anatomical model, using one or more deformation techniques; and
  generating, based on the deformed anatomical model, one or more annotated augmented data elements, each providing predicted information of the anatomical structure, wherein each annotated augmented data element comprises a set of one or more annotated augmented medical images,
  wherein the step of obtaining the anatomical model and the step of deforming the anatomical model is based on at least the one or more annotated data elements,
  wherein the step of generating one or more annotated augmented data elements comprises processing the deformed anatomical model using a generative adversarial network to generate the one or more annotated augmented data elements.

2. The computer-implemented method of claim 1, wherein the step of obtaining the anatomical model comprises generating the anatomical model using at least the one or more annotated data elements.

3. The computer-implemented method of claim 2, wherein:
  the obtained anatomical model comprises:
    first data representing a generic shape of the anatomical structure on which information is provided by the one or more annotated data elements; and
    second data representing variations from the generic shape of the anatomical structure; and
  the step of deforming the anatomical model comprises:
    perturbing a portion of the second data and generating a deformed anatomical model by applying at least the perturbed portion of the second data to the first data.

4. The computer-implemented method of claim 3, wherein the first data represents:
  a mean/average shape of the anatomical structures on which the one or more annotated data elements provides information;
  a largest shape of the anatomical structures on which the one or more annotated data elements provide information; or
  a smallest shape of the anatomical structures on which the one or more annotated data elements provide information.

5. The computer-implemented method of claim 3, wherein the first data comprises a matrix of vertices and/or polygon information that define the generic shape of the type of anatomical structure.

6. The computer-implemented method o claim 1, wherein the anatomical model is deformable according to a plurality of deformation techniques, and the step of deforming the anatomical model comprises deforming the anatomical model using a subset of the plurality of deformation techniques.

7. The computer-implemented method of claim 1, wherein the step of generating the one or more annotated augmented data elements comprises:
  generating one or more augmented data elements using the deformed anatomical model; and
  annotating each augmented data element with information derived from the deformed anatomical model, to thereby generate the annotated augmented data elements.

8. The computer-implemented method of claim 1, wherein the step of generating one or more annotated augmented data elements comprises:
  processing the deformed anatomical structure to computer a vector deformation field; and
  processing one or more of the annotated data elements using the vector deformation field to generate the one or more annotated augmented data elements.

9. The computer-implemented method of claim 1, further comprising a step of receiving a user input and:
  controlling the number of one or more annotated data elements generated responsive to the user input; and/or
  controlling the number or type of deformation techniques used when deforming the anatomical model to generate the deformed anatomical model responsive to the user input.

10. A computer-implemented method of training a machine-learning algorithm using annotated data elements, the method comprising:
  obtaining one or more annotated data elements;
  generating annotated augmented data elements by performing the method of claim 1; and
  training the machine-learning algorithm using the one or more annotated data elements and the annotated augmented data elements.

11. A non-transitory computer readable medium comprising computer program code that, when executed on a computing device having a processing system, causes the processing system to perform all of the steps of the method according to claim 1.

12. A processing system for generating annotated augmented data elements for training a machine-learning algorithm that processes a data element of an anatomical structure to annotate generate one or more annotations, the processing system being adapted to:
  obtain one or more annotated data elements, each providing information about a same type of anatomical structure, wherein each annotated data element comprises a set of one or more annotated medical images;

obtain an anatomical model of the type of anatomical structure, wherein the anatomical model is a three-dimensional anatomical model of the type of anatomical structure;

deform the anatomical model, using one or more deformation techniques; and generate, based on the deformed anatomical model, one or more annotated augmented data elements, each providing predicted information of the anatomical structure, wherein each annotated augmented data element comprises a set of one or more annotated augmented medical images, wherein the step of obtaining the anatomical model and the step of deforming the anatomical model is based on at least the one or more annotated data elements, wherein the step of generating one or more annotated augmented data elements comprises processing the deformed anatomical model using a generative adversarial network to generate the one or more annotated augmented data elements.

* * * * *